G. R. COWDERY.
FISHING ROD HOLDER.
APPLICATION FILED SEPT. 1, 1921.
1,410,798.
Patented Mar. 28, 1922.
2 SHEETS—SHEET 1.
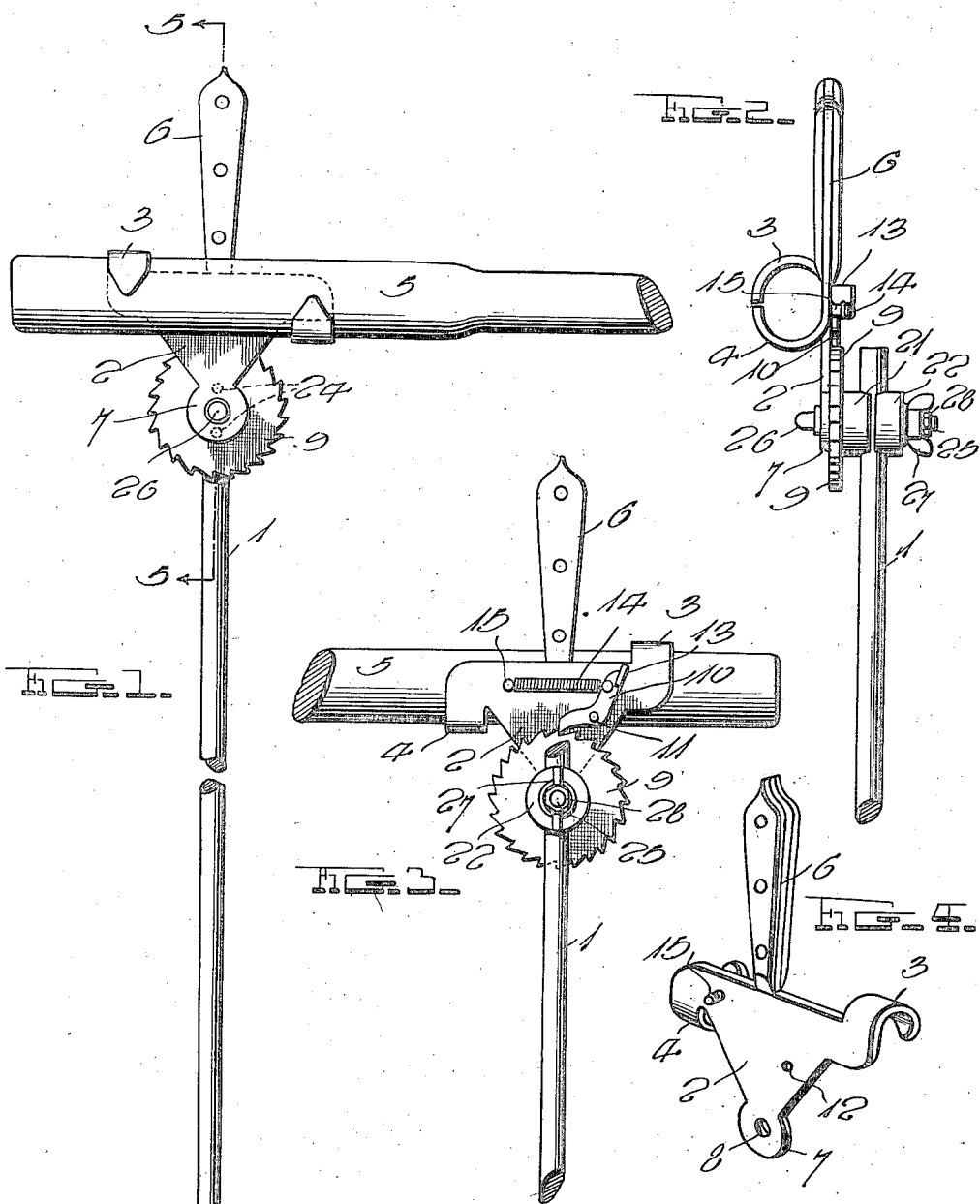
Witness
H. Woodard
Inventor
G. R. Cowdery
By H. B. Willson & Co.
Attorneys G. R. COWDERY.
FISHING ROD HOLDER.
APPLICATION FILED SEPT. 1, 1921.
1,410,798.
Patented Mar. 28, 1922.
2 SHEETS—SHEET 2.
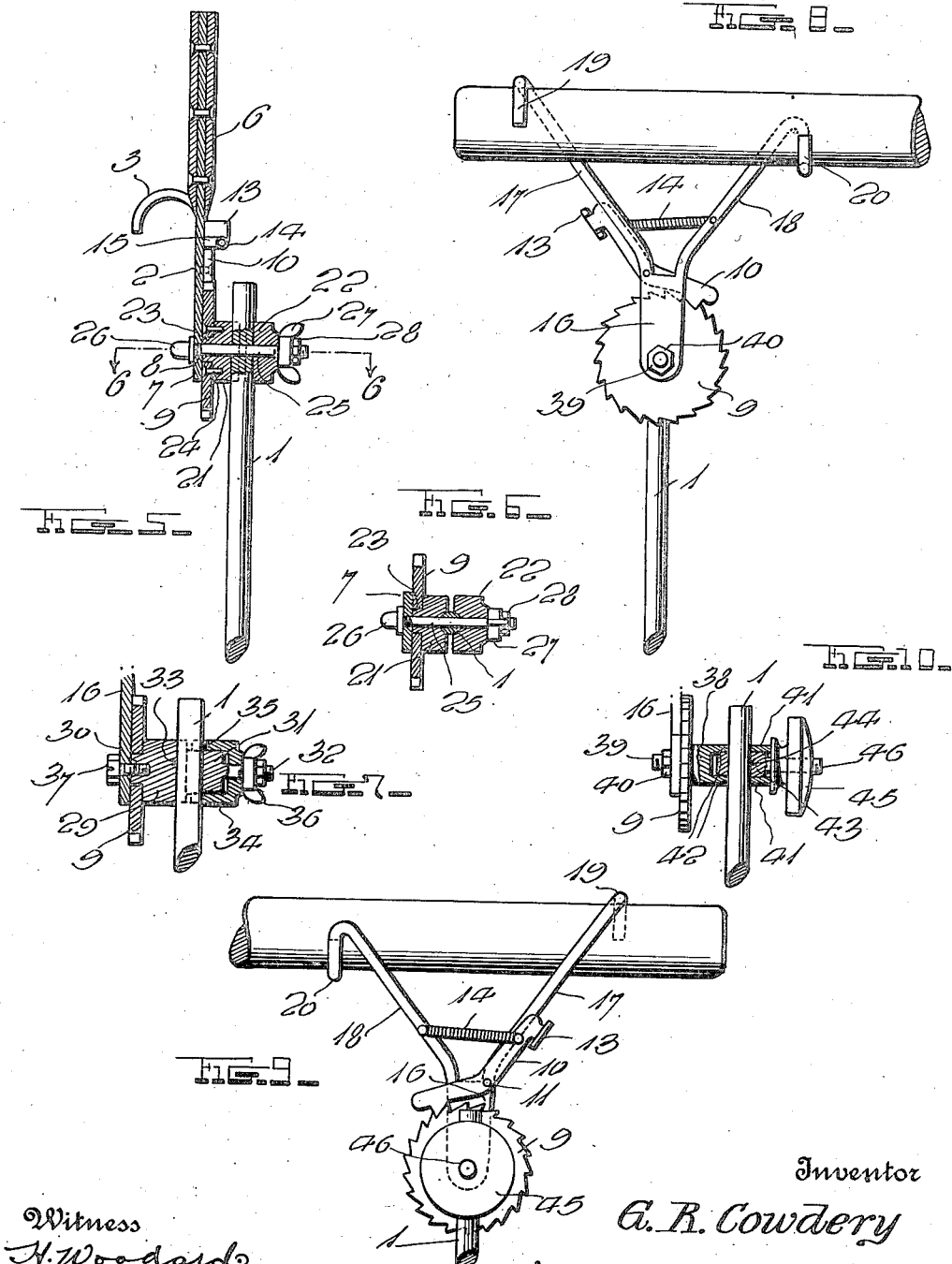
Witness
H. Woodard
Inventor
G. R. Cowdery
By H. B. Wilson & Co.
Attorneys

UNITED STATES PATENT OFFICE.

GEORGE REX COWDERY, OF OTTUMWA, IOWA.

FISHING-ROD HOLDER.

1,410,798.  Specification of Letters Patent.  Patented Mar. 28, 1922.

Application filed September 1, 1921. Serial No. 497,480.

*To all whom it may concern:*

Be it known that I, GEORGE R. COWDERY, a citizen of the United States, residing at Ottumwa, in the county of Wapello and State of Iowa, have invented certain new and useful Improvements in Fishing-Rod Holders; and I do declare the following to be a full, clear, and exact description of the invention, such as will enable others skilled in the art to which it appertains to make and use the same.

This invention relates to an improved fishing rod holder and one object of the invention is to provide a holder having improved rod engaging means and improved means for adjustably mounting the rod engaging means in operative connection with a ratchet wheel or disk, the holder being provided with a pawl for engaging the ratchet disk and releasably holding the rod holding means at a desired angle.

Another object of the invention is to provide a rod holding device in which the rod engaging means is so constructed that the rod can be easily put in place or removed and the rod engaging means readily set at the desired angle without danger of the rod being knocked loose.

Another object of the invention is to provide a rod holder having a stake or standard and a rod engaging element connected with the stake by an improved clamp so constructed that the clamp may securely engage the rod at a desired point but may be released when so desired.

This invention is illustrated in the accompanying drawings, wherein:

Figure 1 is a view showing the improved rod holder in side elevation.

Figure 2 is a view taken at right angles to the showing in Fig. 1 with the rod removed.

Figure 3 is a view in side elevation looking at the opposite side from that shown in Fig. 1.

Figure 4 is a perspective view of the rod engaging element.

Figure 5 is a sectional view taken along the line 5—5 of Fig. 1 with the stake shown in elevation.

Figure 6 is a transverse sectional view taken along the line 6—6 of Fig. 5.

Figure 7 is a sectional view showing a modified form of clamp.

Figure 8 is a view similar to Fig. 1 showing a modified form of rod holder.

Figure 9 is a view looking at the opposite side of the structure shown in Fig. 8.

Figure 10 is a fragmentary view showing the clamp of Figs. 8 and 9 in section and the adjacent parts in elevation.

This improved rod holder is provided with a stake 1 which will be formed of metal or some other suitable material and is tapered at its lower end as shown in Fig. 1 so that it may be readily driven into the ground. The rod engaging bracket shown in Fig. 1 through 4 may be made use of or a bracket such as shown in Figs. 8 and 9 may be used of. These brackets will be assembled in connection with a ratchet wheel carried by a clamp which may be constructed as shown in Figs. 5 and 6 or as shown in Fig. 7 or as shown in Fig. 10.

In the form shown in Figs. 1, 2 and 3 there has been provided a rod engaging bracket 2 which is stamped from sheet metal and provided with upper and lower arms 3 and 4 which are bent as shown to extend above and below the handle portion of the fishing rod 5. An actuating handle 6 extends upwardly between the arms 3 and 4 so that in this form, the bracket may be easily swung to the adjusted position. The lower portion of this bracket terminates in a head 7 having an opening 8 formed therein to receive the pin which pivotally mounts the bracket in operative relation to the ratchet wheel 9 which will be carried by the clamp. A pawl 10 is pivotally connected with the bracket by means of a pin 11 which fits into an opening 12 formed in this bracket and this pawl which is provided with an operating handle 13 so that it can be easily moved to a releasing position, is engaged by a spring 14 so that it will be yieldably held in operative engagement with the ratchet wheel. The second end of this spring is mounted upon a pin 15.

In the form shown in Figs. 8 and 9, the bracket is provided with a solid lower portion 16 from the upper end of which extends arms 17 and 18. These arms extend upwardly in diverging relation and have their end portions bent to provide hooks 19 and 20 which correspond to the hooks 3 and 4. The pawl will be pivotally connected with one of these arms and the spring will be connected with the second arm as shown in these figures so that the pawl may be yieldably held in operative engagement with the ratchet wheel.

The ratchet and ratchet disk are to be carried by a clamp which will engage the rod or standard 1 and firmly grip this rod. This clamp may be formed as shown in Figs. 5 and 6 or as shown in Fig. 7 or if desired it may be formed as shown in Fig. 10. In the form shown in Figs. 5 and 6, the clamp is provided with the two sections or jaws 21 and 22 which are in the form of blocks positioned upon opposite sides of the rod 1 and having their inner faces cut to receive the rod as shown in Fig. 6. The jaw or block 21 has its outer end portion reduced to provide a neck 23 to extend through a central opening formed in the ratchet disk 9. This ratchet disk may be held against turning upon this neck 23 in any suitable manner, but in the present illustration there has been provided screws 24 which pass through the disk and are screwed into threaded sockets formed in the block. A securing pin or bolt 25 passes through the lower end portion of the bracket and through alined openings formed in the blocks and rod 1 and is provided at one end with a head 26 which engages the outer face of the bracket. A winged nut 27 is screwed upon the threaded end portion of this bolt 25 and when tightened will serve to move the blocks toward each other and thus securely clamp the rods between the blocks. The bracket will be pivotally held in place but will be permitted the necessary swinging movement. After the winged nut 27 has been tightened the desired amount, a locking nut 28 will be tightened and the nut 27 will be prevented from accidentally working loose.

In the form shown in Fig. 7, the clamp is provided with a block 29 having a reduced end 30 upon which the ratchet disk 9 is placed and secured against rotary movement. The opposite end portion is reduced as shown at 31 and is further reduced to provide a threaded stem 32. This block is provided with a vertically disposed passage 33 so that the block may be slidably mounted upon the rod 1. It should be noted that this passage 33 is cut partially through the main body of the block and partially through the reduced portion 31 so that the rod may be tightly gripped by means of a cap 34 which fits upon the reduced portion 31 and is provided with a closed outer end having an opening through which will pass the stem 32. This cap is provided with cutouts or notches 35 through which the rod 1 will pass. The winged securing nut 36 is to be screwed upon this threaded rod 32 and when tightened will move the cap 34 to apply pressure against the rod 1 and cause the rod to be firmly gripped and the clamp thus securely but releasably held in an adjusted position upon the rod. The reduced extension 30 of this block 29 is provided with a threaded socket to receive the threaded portion of the machine screw 37 which serves to pivotally mount the bracket. It should be noted that this machine screw has its threads terminating short of the head so that it may be screwed tightly in place without applying too much pressure to the bracket and further to permit of its being screwed tightly into place and not be subject to working loose when the device is in use.

In the form shown in Fig. 10, the block 38 which carries the ratchet disk 9 is provided with a threaded stem 39 upon which will be mounted a securing nut 40 to retain the bracket in place upon this stem in operative relation to the ratchet disk. This block 38 is provided with arms 41 which are provided with openings 42 to receive the standard 1. A core or block 43 is positioned between the arms 41 and is provided with an opening 44 to register with the openings 42 and block 38 to be and thus permit the core and block 38 to be slidably mounted upon the rod 1. When it is desired to secure the clamp in a set position upon the rod or stake 1, the securing nut 45 which is mounted upon the threaded stem 46 of the core will be turned and thus tightened until it engages the ends of the arms and causes the filler block or core to be drawn towards the free ends of these arms. The stake or rod 1 will thus be firmly gripped by the arms and core and the clamp will be securely but releasably held in an adjusted position.

When this fishing rod holder is in use, the stake or standard 1 will first be driven into the ground and after the stake is firmly in place, the clamp will be released and moved to the desired position and then again tightened so that it will be secured at the desired distance above the ground. The bracket can then be swung to approximately the proper position to hold the fishing rod at the desired angle and the rod can then be put in place as shown in Figs. 1 and 8. If it is found that the fishing rod does not extend at just the angle desired, the proper adjustment can be made. The rod can now be removed from the holder and after a cast has been made and the line allowed to run out as far as necessary, the fishing rod can be replaced as shown and the reel of the rod turned to tighten the line and take up any slack in the line. When a fish bites, the rod can be easily and quickly removed from the holder and the line reeled in. It will thus be seen that with this device, a fisherman can attend to more than one line as he does not have to hold the rod.

I claim:

1. A fishing rod holder comprising a standard a clamp having jaw sections movable into and out of gripping engagement with said standard, the outer end portion of one jaw being reduced, a ratchet disk fitting upon the reduced end portion of the jaw and held against movement thereon, a rod engaging bracket pivotally held against the reduced end portion of the jaw and ratchet disk, and having swinging movement concentric to the ratchet disk and a pawl carried by said bracket and yieldably engaging the ratchet disk to hold the bracket against swinging movement in one direction.

2. A fishing rod holder comprising a standard to be driven into the ground, a clamp having jaws and means for moving the jaws into gripping engagement with the standard, a stationary ratchet disk removably mounted upon the outer end portion of one of the jaws of said clamp and held against movement thereon, a bracket having means for releasably holding a fishing rod in engagement with the bracket, releasable means for pivotally mounting the bracket against the ratchet disk and outer end of the last mentioned jaw for swinging movement in operative relation to the ratchet disk, and a spring actuated pawl carried by said bracket and engaging said ratchet disk to hold the bracket against swinging movement in one direction.

3. A fishing rod holder comprising a standard, a clamp having a major section having one end portion reduced and terminating in a threaded stem extension, the major section having a transverse passage at the inner end of the reduced end portion receiving the standard to slidably mount the major section upon the clamp, a cup-shaped auxiliary clamp section slidably fitting upon the reduced end portion of the major section and provided with recesses receiving said standard, a securing nut upon the threaded stem engaging the auxiliary section to move the same into clamping engagement with said standard, a ratchet disk rigidly carried by said major clamp section, a rod carrying bracket pivotally mounted adjacent said ratchet disk, and a pawl carried by said bracket and engaging the ratchet disk.

4. A fishing rod holder comprising a standard, a clamp having jaw sections upon opposite sides of the standard, a ratchet disk rigidly carried by one section, a rod carrying bracket fitting against said disk, a fastener bolt extending through the bracket, clamp sections and standard and pivotally mounting the bracket, a securing nut upon said bolt engaging the second clamp section and bringing the clamp sections into tight engagement with the standard when tightened and a pawl carried by said bracket and engaging said ratchet disk.

In testimony whereof I have hereunto set my hand.

GEORGE REX COWDERY.